United States Patent
Hong et al.

(10) Patent No.: US 10,511,994 B2
(45) Date of Patent: Dec. 17, 2019

(54) METHODS FOR CONFIGURING BUFFER STATUS REPORT FOR NEXT-GENERATION MOBILE COMMUNICATION AND APPARATUSES THEREOF

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/004,783

(22) Filed: Jun. 11, 2018

(65) Prior Publication Data
US 2018/0368023 A1 Dec. 20, 2018

(30) Foreign Application Priority Data

Jun. 15, 2017 (KR) .................. 10-2017-0076126
May 3, 2018 (KR) .................. 10-2018-0051293

(51) Int. Cl.
*H04W 4/00* (2018.01)
*H04W 28/02* (2009.01)
(Continued)

(52) U.S. Cl.
CPC ... *H04W 28/0278* (2013.01); *H04W 72/0413* (2013.01); *H04W 72/10* (2013.01)

(58) Field of Classification Search
CPC ........... H04W 72/042; H04W 72/0413; H04W 72/0406; H04L 5/0048; H04L 5/0055
See application file for complete search history.

(56) References Cited

U.S. PATENT DOCUMENTS

2006/0058038 A1* 3/2006 Das .................. H04W 68/00
455/456.1
2006/0165045 A1* 7/2006 Kim .................. H04L 29/06
370/349
(Continued)

FOREIGN PATENT DOCUMENTS

KR 10-2009-0090274 A 8/2009
KR 10-2012-0025615 A 3/2012

OTHER PUBLICATIONS

3GPP, 3GPP TS 36.321 V9.5.0, "3rd Generation Partnership Project; Technical Specification Group Radio Access Network; Evolved Universal Terrestrial Radio Access (E-UTRA); Medium Access Control (MAC) protocol specification (Release 9)", Dec. 2011, pp. 1-48.

*Primary Examiner* — Atique Ahmed
(74) *Attorney, Agent, or Firm* — IP Legal Services, LLC

(57) ABSTRACT

Provided are a method and apparatus for efficiently transmitting a buffer status report for a plurality of logical channel groups (LCG) from a terminal to a base station. The method may include receiving allocation information for uplink resources from a base station; determining whether the number of padding bits for data transmission using the uplink resources is i) greater than or equal to a first value and ii) less than a second value; determining whether available data for uplink transmission is present in one or more logical channel groups (LCGs) when the number of padding bits is greater than or equal to the first value and is less than the second value; and transmitting Short Truncated BSR or Long Truncated BSR to the base station according to a result of comparison between the number of padding bits and the first value when available data for uplink transmission is present in the one or more LCGs.

16 Claims, 20 Drawing Sheets

(51) Int. Cl.
    *H04W 72/04*    (2009.01)
    *H04W 72/10*    (2009.01)

(56) References Cited

U.S. PATENT DOCUMENTS

| | | | |
|---|---|---|---|
| 2009/0113086 A1* | 4/2009 | Wu | H04W 72/1284 |
| | | | 710/56 |
| 2009/0219951 A1* | 9/2009 | Chun | H04W 8/26 |
| | | | 370/474 |
| 2010/0098011 A1* | 4/2010 | Pelletier | H04W 72/1242 |
| | | | 370/329 |
| 2011/0141983 A1* | 6/2011 | Hong | H04W 28/0278 |
| | | | 370/329 |
| 2012/0099452 A1 | 4/2012 | Dai et al. | |
| 2013/0114445 A1* | 5/2013 | Wen | H04L 5/0007 |
| | | | 370/252 |
| 2017/0245292 A1* | 8/2017 | Agiwal | H04W 28/02 |
| 2018/0270700 A1* | 9/2018 | Babaei | H04W 28/0278 |

* cited by examiner

Short BSR/Truncated BSR MAC Control Element Format

Long BSR MAC Control Element Format

FIG.4

| LCG ID | | | Buffer Size(B/S) | | | | | Oct 1 |
|---|---|---|---|---|---|---|---|---|
| B/S | R | R | R | R | R | R | R | Oct 2 |

FIG.10

| Index | BS value | Index | BS value | Index | BS value | Index | BS value |
|---|---|---|---|---|---|---|---|
| 0 | 0 | 8 | ≤ 102 | 16 | ≤ 1446 | 24 | ≤ 20516 |
| 1 | ≤ 10 | 9 | ≤ 142 | 17 | ≤ 2014 | 25 | ≤ 28581 |
| 2 | ≤ 14 | 10 | ≤ 198 | 18 | ≤ 2806 | 26 | ≤ 39818 |
| 3 | ≤ 20 | 11 | ≤ 276 | 19 | ≤ 3909 | 27 | ≤ 55474 |
| 4 | ≤ 28 | 12 | ≤ 384 | 20 | ≤ 5446 | 28 | ≤ 77284 |
| 5 | ≤ 38 | 13 | ≤ 535 | 21 | ≤ 7587 | 29 | ≤ 107669 |
| 6 | ≤ 53 | 14 | ≤ 745 | 22 | ≤ 10570 | 30 | ≤ 150000 |
| 7 | ≤ 74 | 15 | ≤ 1038 | 23 | ≤ 14726 | 31 | > 150000 |

FIG.11

| Index | Buffer Size (BS) value [bytes] | Index | Buffer Size (BS) value [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | 46 | 89272 < BS <= 109774 |
| 15 | 147 < BS <= 181 | 47 | 109774 < BS <= 134986 |
| 16 | 181 < BS <= 223 | 48 | 134986 < BS <= 165989 |
| 17 | 223 < BS <= 274 | 49 | 165989 < BS <= 204111 |
| 18 | 274 < BS <= 337 | 50 | 204111 < BS <= 250990 |
| 19 | 337 < BS <= 414 | 51 | 250990 < BS <= 308634 |
| 20 | 414 < BS <= 509 | 52 | 308634 < BS <= 379519 |
| 21 | 509 < BS <= 625 | 53 | 379519 < BS <= 466683 |
| 22 | 625 < BS <= 769 | 54 | 466683 < BS <= 573866 |
| 23 | 769 < BS <= 945 | 55 | 573866 < BS <= 705666 |
| 24 | 945 < BS <= 1162 | 56 | 705666 < BS <= 867737 |
| 25 | 1162 < BS <= 1429 | 57 | 867737 < BS <= 1067031 |
| 26 | 1429 < BS <= 1757 | 58 | 1067031 < BS <= 1312097 |
| 27 | 1757 < BS <= 2161 | 59 | 1312097 < BS <= 1613447 |
| 28 | 2161 < BS <= 2657 | 60 | 1613447 < BS <= 1984009 |
| 29 | 2657 < BS <= 3267 | 61 | 1984009 < BS <= 2439678 |
| 30 | 3267 < BS <= 4017 | 62 | 2439678 < BS <= 3000000 |
| 31 | 4017 < BS <=4940 | 63 | BS > 3000000 |

FIG.14

| | | | |
|---|---|---|---|
| Buffer Size(B/S) #0 | | B/S #1 | Oct 1 |
| B/S #1 | | B/S #2 | Oct 2 |
| B/S #2 | B/S #3 | | Oct 3 |
| B/S #4 | | B/S #5 | Oct 4 |
| B/S #5 | | B/S #6 | Oct 5 |
| B/S #6 | B/S #7 | | Oct 6 |

FIG.15

| Length | LCG ID1 | B/S #1 | | Oct 1 |
|--------|---------|--------|---|-------|
| B/S #1 | | LCG ID2 | B/S2 | Oct 2 |
| B/S #2 | R | R | R | Oct 3 |

FIG.16

| LCG7 | LCG6 | LCG5 | LCG4 | LCG3 | LCG2 | LCG1 | LCG0 |
|------|------|------|------|------|------|------|------|
| Buffer Size(B/S) #0 |||||| B/S #2 ||
| B/S #2 |||| B/S #4 ||||
| B/S #4 || B/S #6 ||||||

FIG.17

| LCG7 | LCG6 | LCG5 | LCG4 | LCG3 | LCG2 | LCG1 | LCG0 | Oct 1 |
|------|------|------|------|------|------|------|------|-------|
| Buffer Size 2 ||||||||  Oct 2 |
| Buffer Size 4 ||||||||  Oct 3 |
| Buffer Size 6 ||||||||  Oct 4 |

FIG.18

| LCG ID1 | E | B/S #1 | | Oct 1 |
| B/S #1 | LCG ID2 | E | B/S #2 | Oct 2 |
| B/S #2 | | LCG ID3 | E | Oct 3 |
| B/S #3 | | | R | R | Oct 4 |

METHODS FOR CONFIGURING BUFFER STATUS REPORT FOR NEXT-GENERATION MOBILE COMMUNICATION AND APPARATUSES THEREOF

CROSS REFERENCE TO RELATED APPLICATION

This application claims priority from Korean Patent Application Nos. 10-2017-0076126 & 10-2018-0051293, filed on Jun. 15, 2017 & May 3, 2018, which are hereby incorporated by reference for all purposes as if fully set forth herein.

BACKGROUND OF THE INVENTION

1. Field of the Invention

The present disclosure relates to a technology for transmitting and receiving a buffer status report in a next-generation mobile communication network (New Radio (NR) Access Network), and more particularly, to a method and apparatus for efficiently transmitting a buffer status report for a plurality of logical channel groups from a terminal to a base station.

2. Description of the Prior Art

The 3rd Generation Partnership Project (3GPP) recently approved a study item "Study on New Radio Access Technology" for studying next generation/5G radio access technology. Based on this, Radio Access Network Working Group 1 (RAN WG1) has been discussing frame structures, channel coding and modulation, waveforms, and multiple access methods for new radio (NR). Compared to LTE/LTE-Advanced, NR requires a design to satisfy various needs for segmented and specified usage scenarios as well as improved data transmission rates.

Representative usage scenarios of NR may include enhancement Mobile BroadBand (eMBB), massive Machine Type Communication (mMTC), and Ultra Reliable and Low Latency Communications (URLLC). In order to satisfy requirements of each usage scenario, it is required to design a flexible frame structure in comparison with LTE/LTE-Advanced.

In NR, it is necessary to provide services such as eMBB and mMTC, which require high-speed large-capacity data processing, and URLLC, which requires high-speed data processing. This requires efficient scheduling considering various traffic types.

However, in the related art, only information on buffer statuses for four logical channel groups can be transmitted in a buffer status report, thereby causing limitations on efficient scheduling. To overcome these limitations, the buffer status report may be transmitted by simply increasing the number of logical channel groups. However, in this case, overhead of the entire system is increased, and radio resources are wasted.

Therefore, there is a need for a technique of transmitting a buffer status report while minimizing overhead even when the number of logical channel groups are increased for efficient scheduling.

SUMMARY OF THE INVENTION

In the foregoing background, the present disclosure is directed to a method and apparatus for transmitting a buffer status report while minimizing radio resource overhead when the number of logical channel groups is increased.

To solve the foregoing problem, an embodiment provides a method of a terminal for transmitting a buffer status report (BSR) and an apparatus thereof. The method may include receiving allocation information for uplink resources from a base station, determining whether the number of padding bits for data transmission using the uplink resources is i) greater than or equal to a first value and ii) less than a second value, where the first value is a size of Short BSR plus a subheader of the Short BSR, and the second value is a size of Long BSR plus a subheader of the Long BSR, determining whether available data for uplink transmission is present in one or more logical channel groups (LCGs) when the number of padding bits is greater than or equal to the first value and is less than the second value, and transmitting one of Short Truncated BSR and Long Truncated BSR to the base station according to a result of comparison between the number of padding bits and the first value when available data for uplink transmission is present in the one or more LCGs.

In accordance with another embodiment, a method of a base station may be provided for receiving a BSR. The method may include transmitting allocation information for uplink resources to a terminal, receiving one of Short Truncated BSR and Long Truncated BSR determined based on the number of padding bits according to data transmission using the uplink resources when available data for uplink transmission is present in one or more LCGs of the terminal; and confirming the available data for the uplink transmission of the one or more LCGs of the terminal according to one of the Short Truncated BSR and Long Truncated BSR.

In accordance with still another embodiment, a terminal may be provided for transmitting a BSR. The terminal may include a receiver configured to receive allocation information for uplink resources from a base station, a controller configured to determine whether the number of padding bits for data transmission using the uplink resources is i) greater than or equal to a first value and ii) less than a second value, where the first value is a size of Short BSR plus a subheader of the Short BSR, and the second value is a size of Long BSR plus a subheader of the Long BSR and determine whether available data for uplink transmission is present in one or more LCGs when the number of padding bits is greater than or equal to the first value and is less than the second value, and a transmitter configured to transmit Short Truncated BSR or Long Truncated BSR to the base station according to a result of comparison between the number of padding bits and the first value when available data for uplink transmission is present in the one or more LCGs.

In accordance with further another embodiment, a base station may be provided for receiving a BSR. The base station may include a transmitter configured to transmit allocation information for uplink resources to a terminal, a receiver configured to receive one of Short Truncated BSR and Long Truncated BSR determined based on the number of padding bits according to data transmission using the uplink resources when available data for uplink transmission is present in one or more LCGs of the terminal, and a controller configured to confirm the available data for the uplink transmission of the one or more LCGs of the terminal according to the Short Truncated BSR or Long Truncated BSR.

BRIEF DESCRIPTION OF THE DRAWINGS

The above and other aspects, features and advantages of the present disclosure will be more apparent from the following detailed description taken in conjunction with the accompanying drawings, in which:

FIG. 4 shows a Short BSR/Truncated BSR MAC control element;

FIG. 10 illustrates a table for generating index information included in a buffer size field of five bits according to an embodiment;

FIG. 11 illustrates a table for generating index information included in a buffer size field of 6 bits according to an embodiment;

FIG. 14 illustrates a Long BSR format set to a specified size according to an embodiment;

FIG. 15 illustrates a BSR format for specifying the number of LCGs through a BSR according to an embodiment;

FIG. 16 illustrates a Long BSR format according to another embodiment;

FIG. 17 illustrates a Long BSR format according to still another embodiment;

FIG. 18 illustrates a BSR format using an extension field according to an embodiment;

DETAILED DESCRIPTION OF THE EXEMPLARY EMBODIMENTS

Figure 1:
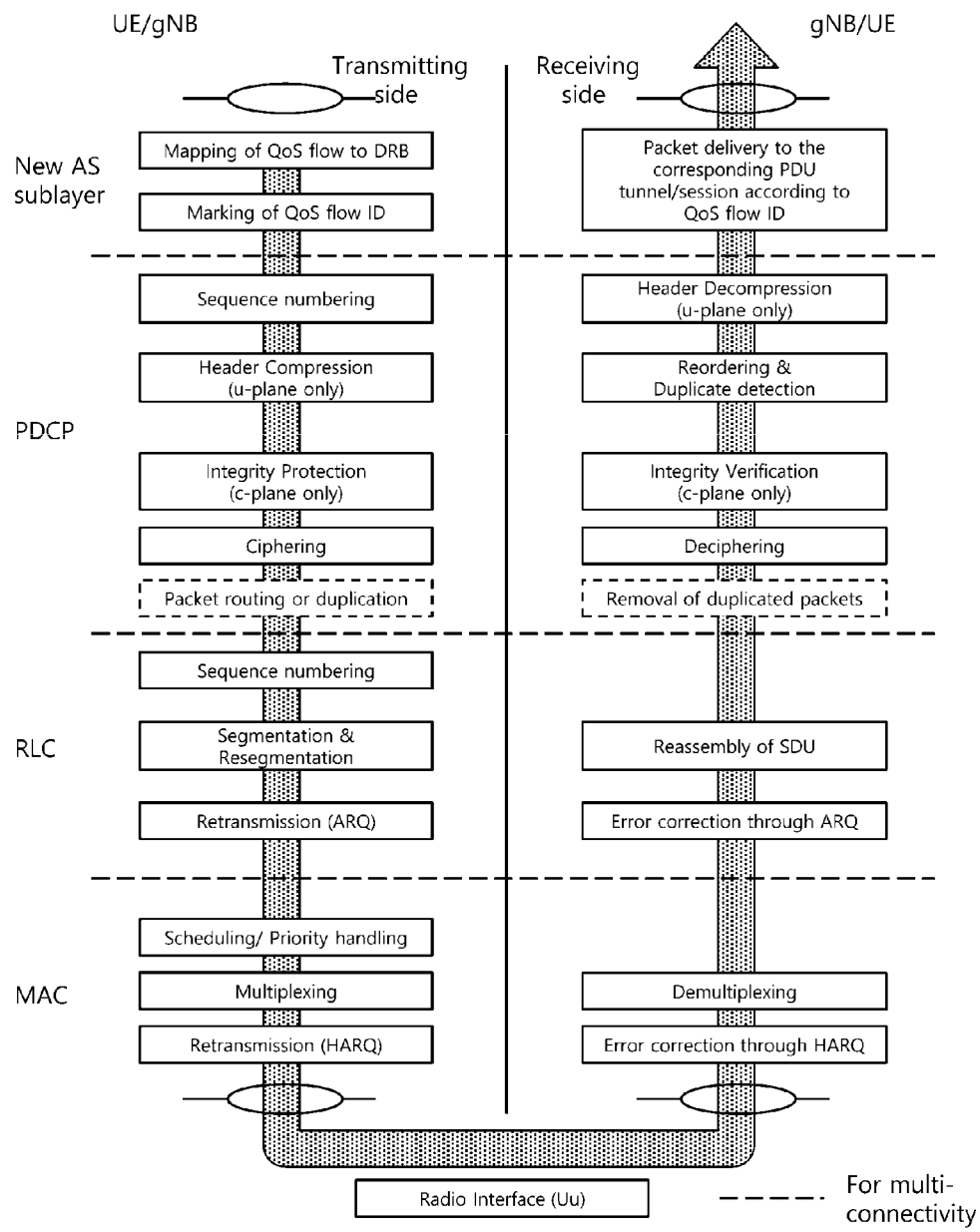
FIG. 1 shows a layer 2 structure for a new radio access technology (RAT)

Hereinafter, some embodiments of the present disclosure will be described in detail with reference to the accompanying drawings. When assigning a reference number to each component shown in the drawings, it should be noted that the same components are given the same reference numbers even though they are shown in different drawings. Further, in the following description of embodiments of the present disclosure, a detailed description of known functions and configurations incorporated herein will be omitted when it is determined that the description may make the subject matter of the present disclosure unclear.

In this specification, a wireless communication system refers to a system for providing various communication services such as voice, packet data, and the like. The wireless communication system includes a user equipment (UE) and a base station (BS).

The UE may be an inclusive concept indicating a terminal utilized in wireless communication, including a mobile station (MS), a UE (UT), a subscriber station (SS), a wireless device, and the like in global systems for mobile communication (GSM) as well as a UE in wideband code division multiple access (WCDMA), long term evolution (LTE), high speed packet access (HSPA), International Mobile Telecommunications for 2020 and beyond (IMT-2020)(5G or New Radio), and the like.

A base station, or a cell, generally refers to a station that communicates with a UE and semantically covers a Node-B, an evolved Node-B (eNB), a gNode-B (gNB), a Low Power Node (LPN), a sector, a site, various forms of antennas, a base transceiver system (BTS), an access point, a point (e.g., a transmitting point, a receiving point, a transmitting and receiving point), a relay node, a megacell, a macrocell, a microcell, a picocell, a femtocell, a remote radio head (RRH), radio unit (RU), small cell, and the like.

There is a base station for controlling each of the above various cells. Thus, the base station may be construed in the following two ways: (1) the base station may be an apparatus itself that provides a megacell, a macrocell, a microcell, a picocell, a femtocell, and a small cell in association with a wireless area; or (2) the base station may indicate the wireless area itself. In (1), the base stations may be all apparatuses that provide a predetermined wireless area and that are controlled by the same entity or all apparatus that interact with one another to cooperatively configure a wireless area. Based on the configuration type of the wireless area, the base station may be a point, a transmitting and receiving point, a transmitting point, a receiving point, and the like. In (2), the base station may be a wireless area itself where signals are received or transmitted from the perspective of the UE or from the stance of a neighboring BS.

In this specification, a cell may refer to the coverage of a signal transmitted from a transmission/reception point (or a transmission point), a component carrier having the coverage of a signal transmitted from a transmission/reception point, or a transmission/reception point itself.

In this specification, the UE and the base station are used as two (uplink or downlink) inclusive transceiving subjects to embody the technology or technical concepts described in the specification and may not be limited to predetermined terms or words.

Here, uplink (UL) refers to data transmission and reception from a UE to a base station, and downlink (DL) refers to data transmission and reception from the base station to the UE.

Uplink transmission and downlink transmission may be performed using i) a time division duplex (TDD) scheme in which the transmission is performed based on different times, ii) a frequency division duplex (FDD) scheme in which the transmission is performed based on different frequencies, or iii) a mixed scheme of the TDD scheme and the FDD scheme.

Also, in a wireless communication system, a related specification is made to configure the uplink and the downlink based on a single carrier or a pair of carriers.

The uplink and the downlink may carry control information through a control channel such as a Physical Downlink Control Channel (PDCCH) and a Physical Uplink Control Channel (PUCCH) and may carry data through a data channel such as a Physical Downlink Shared Channel (PDSCH) and a Physical Uplink Shared Channel (PUSCH).

The downlink may refer to communication or a communication path from a multi-transmission/reception point to a terminal, and the uplink may refer to communication or a communication path from a terminal to a multi-transmission/reception point. In the downlink, a transmitter may be a part of the multi-transmission/reception point, and a receiver may be a part of the terminal. In the uplink, a transmitter may be a part of the terminal, and a receiver may be a part of the multi-transmission/reception point.

Hereinafter, signal transmission and reception through a channel such as PUCCH, PUSCH, PDCCH, and PDSCH may be expressed as "PUCCH, PUSCH, PDCCH, and PDSCH are transmitted or received."

Meanwhile, higher layer signaling, which will be described below, includes Radio Resource Control (RRC) signaling that carries RRC information including RRC parameters.

The base station performs downlink transmission to terminals. The base station may transmit the PDCCH for carrying downlink control information such as scheduling needed to receive a downlink data channel, which is a primary physical channel for a unicast transmission, and also carrying scheduling approval information for transmission through an uplink data channel. Hereinafter, transmission and reception of a signal through each channel will be described as transmission and reception of a corresponding channel.

There are no restrictions on multiple access schemes applied to wireless communication systems. Various multiple access schemes, such as Time Division Multiple Access (TDMA), Frequency Division Multiple Access (FDMA), Code Division Multiple Access (CDMA), Orthogonal Frequency Division Multiple Access (OFDMA), Non-Orthogonal Multiple Access (NOMA), OFDM-TDMA, OFDM-FDMA, and OFDM-CDMA, may be used. Here, NOMA includes Sparse Code Multiple Access (SCMA), Low Density Spreading (LDS), and the like.

Embodiments of the present disclosure are applicable to resource allocation in an asynchronous wireless communication scheme that evolves to LTE/LTE-Advanced and IMT-2020 via GSM, WCDMA, and HSPA and in a synchronous wireless communication scheme that evolves to CDMA, CDMA-2000, and UMB.

In this specification, a machine type communication (MTC) terminal may refer to a terminal that supports low cost (or low complexity), a terminal that supports coverage enhancement, or the like. Alternatively, in this specification, the MTC terminal may refer to a terminal that is defined in a predetermined category for supporting low cost (or low complexity) and/or coverage enhancement.

In other words, in this specification, the MTC terminal may refer to a newly defined third generation partnership project (3GPP) Release 13 low cost (or low complexity) UE category/type, which executes LTE-based MTC-related operations. Alternatively, in this specification, the MTC terminal may refer to a UE category/type that is defined in or before 3GPP Release-12 that supports the enhanced coverage in comparison with the typical LTE coverage or supports low power consumption or may refer to a newly defined Release 13 low cost (or low complexity) UE category/type. Alternatively, the MTC terminal may refer to a further enhanced MTC terminal, which is defined in Release-14.

In this specification, a NarrowBand Internet of Things (NB-IoT) terminal refers to a terminal that supports radio access for cellular IoT. The objectives of the NB-IoT technology include improved indoor coverage, large-scale support for low-rate terminals, low latency sensitivity, low terminal cost, low power consumption, and an optimized network structure.

As a representative usage scenario in new radio (NR), which is recently being discussed in the 3GPP, enhanced Mobile BroadBand (eMBB), massive Machine Type Communication (mMTC), and Ultra Reliable and Low Latency Communication (URLLC) have been proposed.

In this specification, a frequency, a frame, a subframe, resources, resource blocks, a region, a band, a sub-band, a control channel, a data channel, a synchronization signal, various kinds of reference signals, various kinds of signals, and various kinds of messages which are associated with NR may be interpreted with various meanings in the past, at present, or in the future.

For example, in this specification, LTE and NR refer to different radio access technologies, and a new radio access technology, which is being discussed in 3GPP Release 15, will be described as NR. NR may have various differences from LTE in terms of a frame structure, a channel, a core network technology, and the like. Various functions for wireless transmission, high-speed transmission, and large-scale data transmission in high bands may be added to the NR.

Hereinafter, for convenience of description, the typical radio access technology will be described as LTE, and a new radio access technology being discussed in the 3GPP will be described as NR. Also, the base station may be an eNB using LTE technology and also may be a gNB using NR technology, which will be separately described as necessary.

Also, the term "cell" is comprehensively used to cover a wireless path, a wireless link, a carrier, and the like for carrying data. One base station may transmit and receive data via a plurality of cells. Alternatively, the terminal may transmit and receive data using a plurality of cells through cells controlled by two base stations. In the following description, a case in which one base station controls a plurality of cells is referred to as carrier aggregation, and a case in which a plurality of cells controlled by two or more base stations are used is referred to as dual connectivity.

The present disclosure relates to a method and apparatus for configuring a format of a buffer status report (BSR) in a next-generation mobile terminal network (NR).

New Radio (NR)

In the 3GPP, research has being conducted on next-generation/5G radio access technology (hereinafter referred to as NR, for convenience of description). NR provides a new access stratum (AS) sublayer higher than packet data convergence protocol (PDCP) in order to provide flow-based Quality of Service (QoS).

FIG. 1 shows a layer 2 structure for a new radio access technology (RAT).

As shown in FIG. 1, main services and functions of the new AS sublayer are as follows:

Mapping between a QoS flow and a data radio bearer;
Marking QoS flow ID in both DL and UL packets.

Also, the new user plane protocol layer is applicable for connections to the NextGen Core. A single protocol entity of the new user plane protocol layer is configured for each individual PDU session.

Buffer Status Reporting Procedure

The buffer status reporting procedure is used to provide a serving base station with information about the amount of data available for transmission in UL buffers associated with a medium access control (MAC) entity. An RRC entity controls BSR transmission by configuring three timers periodicBSR-Timer, retxBSR-Timer, and logicalChannelSR-ProhibitTimer and by performing signaling to allocate the logical channel to a logical channel group (LCG) for each logical channel.

A BSR shall be triggered if any of the following events occur:
- UL data, for one logical channel which belongs to one LCG, becomes available for transmission in a radio link control (RLC) entity or a PDCP entity. Either the data belongs to a logical channel with higher priority than the priorities of the logical channels which belong to any LCG and for which data is already available for transmission, or there is no data available for transmission for any of the logical channels which belong to an LCG. In this case, the BSR is referred to below as "Regular BSR";
- UL resources are allocated and the number of padding bits is greater than or equal to the size of the BSR MAC control element plus its subheader, in which case the BSR is referred below to as "Padding BSR";
- Retransmission BSR timer (retxBSR-Timer) expires and the terminal has data available for transmission for any of the logical channels which belong to an LCG, in which case the BSR is referred to below as "Regular BSR";
- periodic BSR timer (periodicBSR-Timer) expires, in which case the BSR is referred to below as "Periodic BSR".

Along with the above classification based on the types of BSR trigger, the BSR may be classified as Short BSR, Truncated BSR, and Long BSR according to its format.

Figure 2:
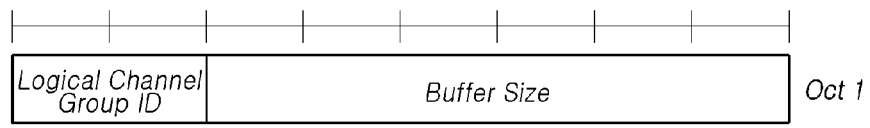
FIG. 2 shows a format of a Short buffer status report (BSR)/Truncated BSR medium access control (MAC) control element according to the related art.
Figure 3:
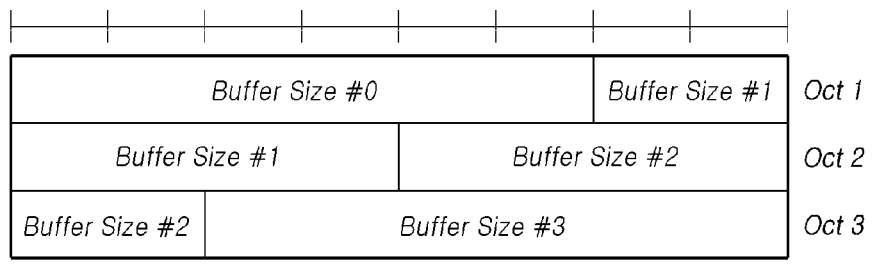
FIG. 3 shows a format of a Long BSR MAC control element according to the related art.

FIG. 2 shows a Short BSR format according to the related art, and FIG. 3 shows a Long BSR format according to the related art.

For Regular BSR and Periodic BSR, if more than one LCG has data available for transmission in a transmission time interval (TTI) in which the BSR is transmitted, Long BSR is transmitted; otherwise, Short BSR is transmitted.

For Padding BSR: if the number of padding bits is greater than or equal to the size of the Short BSR plus its subheader but less than the size of the Long BSR plus its subheader (i.e., if more than one LCG has data available for transmission in the TTI where the BSR is transmitted), Truncated BSR of the LCG with the highest priority logical channel with data available for transmission is transmitted; otherwise, Short BSR is transmitted.

Otherwise, if the number of padding bits is greater than or equal to the size of the Long BSR plus its subheader, Long BSR is transmitted.

As shown in FIG. 2, Short BSR and Truncated BSR include LCG ID information and buffer size information. As shown in FIG. 3, Long BSR sequentially includes buffer size information regarding four LCGs.

A BSR may be transmitted to a MAC Control Element (MAC CE), and a MAC Protocol Data Unit (PDU) may contain at most one MAC BSR control element.

All triggered BSRs shall be cancelled when a BSR is included in a MAC PDU for transmission.

The terminal shall transmit at most one Regular/Periodic BSR in a TTI.

All BSRs transmitted in a TTI always reflect the buffer status after all MAC PDUs have been built for this TTI. Each LCG shall transmit at the most one buffer status value per TTI. This value shall be transmitted in all BSRs transmitting buffer status for this LCG.

In this specification, BSR is classified into Short BSR and Long BSR and formats thereof will be described. Short BSR and Short Truncated BSR may be configured in the same format, and Long BSR and Long Truncated BSR may be configured in the same format. Accordingly, the terms "Short BSR" and "Short Truncated BSR" may be interchangeably used in terms of format, and the terms "Long BSR" and "Long Truncated BSR" may be interchangeably used in terms of format. Accordingly, in terms of format, as necessary, Short BSR and Short Truncated BSR may have the same meaning, and Long BSR and Long Truncated BSR may have the same meaning.

Data Available for Transmission

For the purpose of MAC layer buffer status reporting, the terminal shall consider the following as data available for transmission in the RLC layer:
- Segments or RLC Service Data Units (SDUs) not yet included in the RLC data PDU;
- RLC data PDUs (RLC AM) pending for retransmission;
- RLC data PDUs pending for initial transmission.

For the purpose of MAC layer buffer status reporting, the terminal shall consider PDCP control PDUs, as well as the following as data available in the PDCP layer:

For SDUs for which no PDU has been submitted to lower layers:
- the SDU itself, if the SDU has not yet been processed by PDCP, or
- the PDU if the SDU has been processed by PDCP.

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report:
- the SDU itself, if the SDU has not yet been processed by PDCP, or
- the PDU if the SDU has been processed by PDCP.

As described above, the legacy LTE technology supports two types of BSR formats (Short BSR and Long BSR). For Long BSR, only four LCGs may be included. NR may provide services such as massive MTC service or URLLC service other than eMBB service. Thus, there is a need for efficient scheduling considering various traffic types. To support this, it is necessary to increase the number of LCGs which is currently limited to 4. However, in this case, the overhead for transmitting the BSR for the increased LCG may be increased. In particular, in the current BSR format, the buffer size field consists of 6 bits, as shown in FIGS. 2 and 3.

Figure 4:
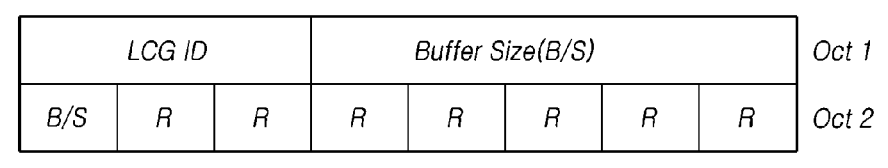

Accordingly, if 3 bits are used for an LCG identifier (LCG ID) field, the Short BSR and Truncated BSR format of FIG. 2 may be provided as shown in FIG. 4.

FIG. 4 shows a Short BSR/Truncated BSR MAC control element.

Referring to FIG. 4, since the LCG ID occupies three bits and provides byte alignment for corresponding MAC Control elements, seven reserved bits are used, which is unnecessary overhead. Thus, radio resources are wasted.

The present disclosure, which has been devised to solve this problem, is directed to providing a method and apparatus for providing a MAC PDU format (e.g., a BSR format or a BSR MAC CE format) capable of providing an efficient buffer status transmission while increasing the number of LCGs which is currently limited to four.

On the other hand, the present disclosure is applicable not only to next generation mobile communication (5G mobile communication/NR) terminals but also to any radio access (e.g., LTE) network/terminal. For convenience of description, hereinafter, a base station may refer to an LTE base station and an eNB of LTE/E-UTRAN. Further, a base station may refer to i) an NR Node, gNB, gNB-CU, or gNB-DU in a 5G wireless network in which a Central Unit (CU) and a Distribute Unit (DU) are separated or ii) a NR base station or gNodeB in which CU and DU are implemented as a single logical entity. Hereinafter, the term "base station" is used for convenience of description, but all above-described entities may be included in the category of this term.

Also, various BSR formats for transmitting a BSR for more than four LCGs using one BSR in order to transmit efficient buffer status information will be described below with reference to respective embodiments. For convenience of description, embodiments will be described based on eight LCGs as an example, but the embodiments are not limited thereto. For example, a MAC PDU format provision method for effectively transmitting Short BSR/Truncated BSR or Long BSR/Truncated BSR will be described. In this specification, a MAC PDU format including BSRs will be described as a BSR format or BSR MAC CE format, and there is no limitation on terms.

Also, in the following embodiments, a BSR format has been described as identifying a buffer size on a logical channel basis as an example. A BSR format that identifies a buffer size on a logical channel basis is also within the scope of the present disclosure.

Also, in this specification, a terminal is described as an entity that transmits a BSR, but the embodiments are not limited thereto. For example, the terminal (e.g., MAC entity) may perform at least one of trigger monitoring of a BSR, determination of a BSR format, and transmission of a BSR format. Accordingly, the terminal should be interpreted as a terminal including a MAC entity and may be interpreted as a MAC entity, a MAC layer, or the like.

Each of the following embodiments may be applied individually or in combination.

Figure 5:
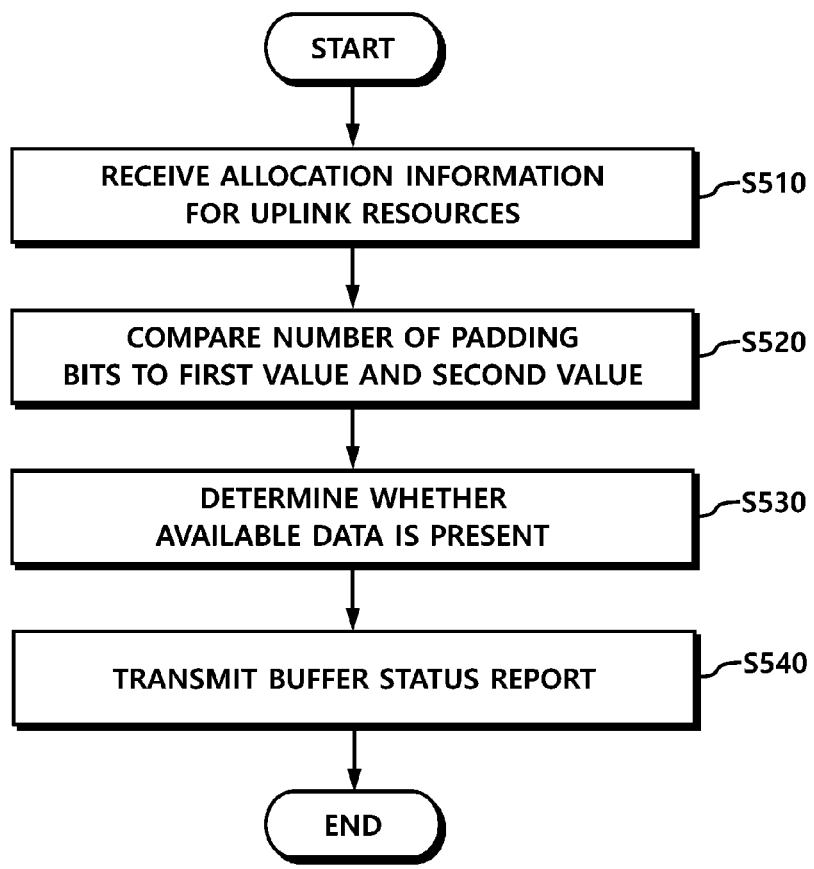
FIG. 5 illustrates operation of a terminal according to an embodiment.

FIG. 5 illustrates operation of a terminal according to an embodiment.

Referring to FIG. 5, a terminal that transmits a BSR may receive uplink resource allocation information from a base station (S510). For example, the terminal may receive allocation information for radio resources to be used for uplink data transmission through scheduling by the base station. For example, the terminal may receive an uplink grant from the base station and receive information regarding radio resources to be used to transmit uplink data to the base station. For another example, the terminal may receive the allocation information through the PDCCH from the base station.

As necessary, the terminal may transmit the uplink data to the base station by using the allocation information. To this end, the terminal may transmit, to the base station, information for indicating that there is uplink data to be transmitted.

The terminal may determine whether the number of padding bits corresponding to the data transmission using the uplink resources is greater than or equal to a first value, which is the size of Short BSR plus its subheader, and is less than a second value, which is the size of Long BSR plus its subheader (S520). For example, when the uplink data is transmitted according to the allocation information, the terminal may transmit padding bits in addition to the uplink data according to allocated radio resources. In this case, the terminal may transmit a BSR in addition to the padding bits to the base station. Accordingly, the terminal may deliver information regarding available data to be transmitted to the base station by efficiently utilizing the padding bits.

For example, in order to utilize the padding bits to deliver the BSR, the terminal may compare the number of padding bits to the size of the MAC CE when the BSR is transmitted. For example, the terminal determines a first value by adding the size of Short BSR and the size of its subheader and compares the number of padding bits to the first value. For another example, the terminal determines a second value by adding the size of Long BSR and the size of its subheader and compares the number of padding bits to the second value. For still another example, the terminal determines whether the number of padding bits is greater than or equal to the first value and is less than the second value. Based on the result, the terminal may determine whether to transmit a padding BSR.

When the number of padding bits is greater than or equal to the first value and is less than the second value, the terminal may determine whether available data for uplink transmission is present in one or more LCGs (S530). When the determination result of step S520 is that the number of padding bits is i) greater than or equal to the first value and ii)_less than the second value, the terminal may determine whether the available data for uplink transmission is present in one or more LCGs. That is, the terminal determines whether the number of padding bits is sufficient to transmit the padding BSR in step S520 and determines whether there is available data for BSR transmission in step S530. Based on this information, the terminal may determine whether to transmit the padding BSR.

When available data for uplink transmission is present in the one or more LCGs, the terminal may transmit Short Truncated BSR or Long Truncated BSR to the base station according to a result of the comparison between the number of padding bits and the first value (S540). For example, when the number of padding bits is sufficient to transmit the padding BSR, and available data for uplink transmission is present in one or more LCGs, the terminal transmits the BSR according to a result of the comparison between the number of padding bits and the first value in S520.

In this case, the BSR may be set and transmitted in the format of Short Truncated BSR or Long Truncated BSR. When the number of padding bits is equal to the first value, the terminal may transmit the BSR to the base station by using the Short Truncated BSR format. On the other hand, when the number of padding bits exceeds the first value, the terminal may transmit the BSR to the base station by using the Long Truncated BSR format.

Formats of the BSRs transmitted by the above-described terminal will be described below with reference to the drawings. The BSR formats may be classified into Short type and Long type. If necessary, Short Truncated BSR and Short BSR may be configured in the same format. Similarly, Long Truncated BSR and Long BSR may be configured in the same format. That is, Truncated BSR is a classification based on not format but transmission type. Accordingly, in this specification, descriptions of Short Truncated BSR and Short BSR may be interchangeable as necessary, and descriptions of Long Truncated BSR and Long BSR may be interchangeable as necessary.

Figure 6:
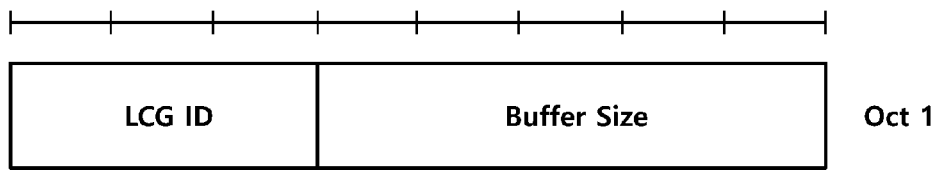
FIG. 6 shows a Short Truncated BSR format according to an embodiment.

FIG. 6 shows a Short Truncated BSR format according to an embodiment.

Referring to FIG. 6, Short Truncated BSR may include an LCG identification information field and a buffer size field. For example, the LCG identification information field may be formed of three bits, and the buffer size field may be formed of five bits.

In this case, the LCG identification information may indicate which LCG is associated with available data included in a corresponding BSR and may include LCG ID information. The buffer size field includes information regarding a buffer size of an LCG indicated by the LCG identification information field.

Meanwhile, Short Truncated BSR may include only buffer size information for one LCG. Accordingly, the terminal should select an LCG to be included in Short Truncated BSR. For example, the terminal may include buffer size information for one LCG including a logical channel with the highest priority among the one or more LCGs. That is, a priority may be set for each logical channel, and the LCG refers to a group of one or more logical channels set with priority information. Accordingly, there is an LCG including a logical channel with the highest priority, and Short Truncated BSR includes only buffer size information for the LCG including the logical channel with the highest priority.

Figure 7:
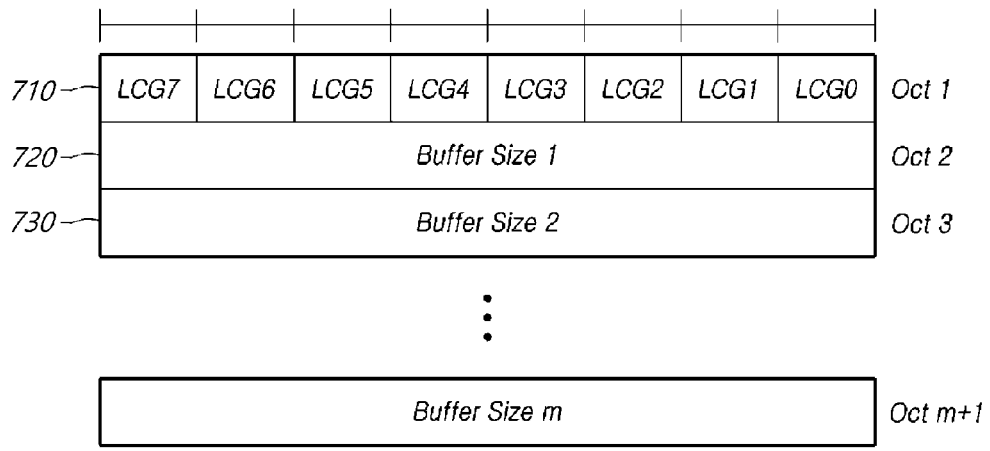
FIG. 7 shows a Long Truncated BSR format according to an embodiment.

FIG. 7 shows a Long Truncated BSR format according to an embodiment.

Referring to FIG. 7, Long Truncated BSR may be composed of an LCG indication field 710 and buffer size fields 720 and 730. The LCG indication field 710 may indicate whether buffer size information for a corresponding LCG is included in a corresponding BSR (Long Truncated BSR). That is, the LCG indication field 710 includes information indicating whether there is a buffer size field for each LCG. For example, the LCG indication field 710 may be configured as an 8-bit bitmap to indicate whether the buffer size field 720 and 730 is present for each of eight LCGs.

For example, each of the LCG indication field 710 and the buffer size fields 720 and 730 may be formed of eight bits, and the LCG indication field 710 may indicate, for each LCG, a case of having available uplink data and a case of not having available uplink data by setting the cases to 1 and 0 (or 0 and 1) using 1 bit. For example, "1" indicates that buffer size information for a corresponding LCG is reported, and "0" indicates that buffer size information for a corresponding LCG is not reported. That is, when the LCG indication field has a value of "01010100," this may indicate that buffer size information for LCGs 2, 4, and 6 is included in a corresponding BSR.

Thus, by using eight bits, it is possible to inform the base station whether each of eight LCGs has available uplink data. Also, the buffer size field 720 and 730 consists of eight bits and may include buffer size information for up to eight LCGs.

The buffer size fields 720 and 730 include index information that is set according to the buffer size information of each LCG, and the index information may be mapped according to a range of the buffer size information and determined according to a preset table. For example, a certain buffer size range may be mapped to one index, and 256 indices may be prestored in the terminal and the base station in the form of a table in order to correspond to 8-bit buffer size information. Thus, the buffer size field may include index information specified according to the table, and upon receiving the BSR from the terminal, the base station checks corresponding index information and confirms a buffer size range on the table indicated by the corresponding index information, thereby confirming buffer size information for an LCG of the terminal. For example, the table may be set in a similar form to that of FIG. 10 or FIG. 11. FIG. 10 shows an index table corresponding to when the buffer size field is formed of five bits, and FIG. 11 shows an index table corresponding to when the buffer size field is formed of six bits.

Figure 8:
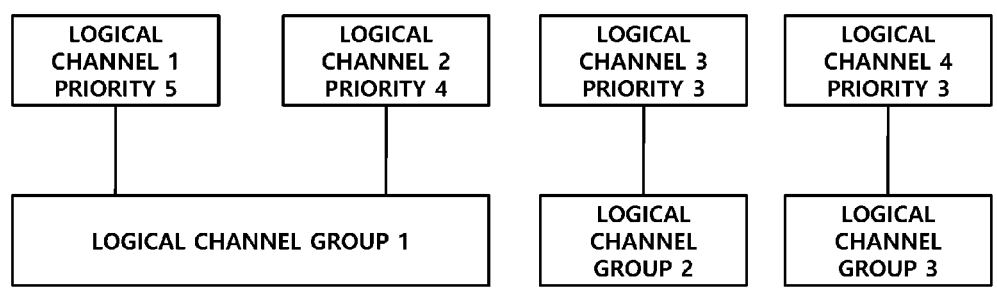
FIG. 8 illustrates a logical channel group (LCG) included in Long Truncated BSR according to an embodiment.

FIG. 8 illustrates an LCG included in Long Truncated BSR according to an embodiment.

Since, for Long Truncated BSR, a BSR is transmitted using padding bits, buffer size information for all the LCGs may not be transmitted. That is, depending on the number of padding bits, the buffer size information may be restricted unlike Long BSR. Accordingly, the terminal should select some LCGs and transmit Long Truncated BSR.

For example, Long Truncated BSR may include buffer size information for one or more selected LCGs. In this case, the one or more LCGs may be selected on the basis of descending order of priorities set for individual logical channels, and the one or more LCGs may be selected on the basis of ascending order of LCG identification information when a plurality of LCGs include logical channels with the same priority. That is, an LCG including a logical channel with higher priority may be selected first, and an LCG having a lower number of LCG identification information (LCG ID) may be selected first when logical channels have the same priority.

Referring to FIG. 8, priority information may be set for each logical channel. For example, the following description assumes that there are four logical channels and three LCGs. Logical channel 1 may be set to priority 5, logical channel 2 may be set to priority 4, and logical channels 3 and 4 may be set to priority 3. The priority may be dynamically set as necessary, and one or more logical channels may be set to the same priority. In this description, a higher number indicates a higher priority, but the embodiments of the present disclosure are not limited thereto. That is, priority 5 indicates a priority higher than priority 4.

LCG 1 may include logical channel 1 and logical channel 2, LCG 2 may include logical channel 3, and LCG 3 may include logical channel 4.

In this case, the LCGs included in Long Truncated BSR are selected on the basis of descending order of priorities of the logical channels of the LCGs. Accordingly, LCG 1, which includes logical channels with the two highest priorities, is first selected. Accordingly, when an LCG is additionally selected depending on the number of padding bits, LCG 2 or LCG 3, which includes a logical channel with the next highest priority (logical channel 3 or logical channel 4), is selected.

In this case, however, since the logical channels have the same priority, the terminal makes selection on the basis of ascending order of LCG identification information. That is, since LCG 2 has a lower identification information than LCG 3, the terminal preferentially selects LCG 2.

As described above, the LCG included in Long Truncated BSR is determined according to priorities of logical channels and identification information for LCGs.

Figure 9:
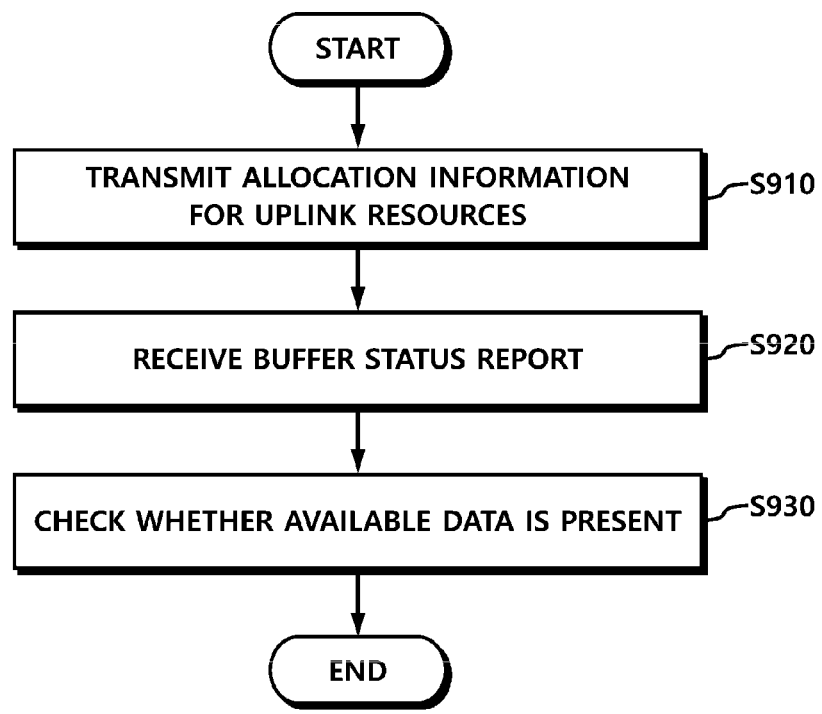
FIG. 9 illustrates operation of a base station according to an embodiment.

FIG. 9 illustrates operation of a base station according to an embodiment.

Referring to FIG. 9, a base station that receives a BSR may transmit allocation information for uplink resources to a terminal (S910). For example, upon a scheduling request from the terminal, the base station may transmit, to the terminal, allocation information for radio resources that may be used by the terminal to transmit uplink data. For example, the base station may receive a scheduling request from the terminal and may transmit an uplink grant to the terminal. For another example, the base station may transmit the allocation information to the terminal through the PDCCH. As necessary, the terminal may transmit the uplink data to the base station by using the allocation information. To this end, the terminal may transmit, to the base station, information for indicating that there is uplink data to be transmitted.

When available data for uplink transmission is present in the one or more LCGs of the terminal, the base station may receive Short Truncated BSR or Long Truncated BSR that is determined on the basis of the number of padding bits according to data transmission using the uplink resources (S920). For example, the base station may receive a BSR of the terminal through padding bits of the uplink data transmitted by the terminal. As described above, in this case, whether to transmit the BSR may be determined depending on comparison between the number of padding bits and the size of MAC CE of Short BSR or Long BSR.

For example, when the number of padding bits is i) greater than or equal to a first value, which is the size of Short BSR plus its subheader, and ii) less than a second value, which is the size of Long BSR plus its subheader, the Short Truncated BSR may be received when the number of padding bits is equal to the first value.

For another example, when the number of padding bits is i) greater than or equal to a first value, which is the size of Short BSR plus its subheader, and ii) less than a second value, which is the size of Long BSR plus its subheader, the Long Truncated BSR may be received when the number of padding bits exceeds the first value.

The base station may confirm available data for uplink transmission of one or more LCGs of the terminal according to the Short Truncated BSR or Long Truncated BSR (S930). For example, the base station may acquire information regarding available data to be carried by an LCG of the terminal to the base station through padding bits of the received uplink data. However, as described above, each BSR includes buffer size information of an LCG selected by the terminal due to a restriction on the number of padding bits.

For example, the Short Truncated BSR may include buffer size information for one LCG including a logical channel with the highest priority among the one or more LCGs and may be composed of an LCG identification information field of 3 bits and a buffer size field of 5 bits.

For another example, the Long Truncated BSR may be composed of an LCG indication field and a buffer size field, and the LCG indication field may be configured as an 8-bit bitmap to indicate whether the buffer size field is present for each of eight LCGs. The Long Truncated BSR includes buffer size information for one or more selected LCGs. The one or more LCGs are selected on the basis of descending order of priorities set for individual logical channels and selected on the basis of ascending order of LCG identification information when a plurality of LCGs include logical channels with the same priority.

Thus, the base station may receive BSR from the terminal and check information regarding available data for uplink transmission of the terminal.

As described above, according to this embodiment, even when the number of LCGs increases, it is possible for the terminal to transmit accurate buffer size information to the base station while minimizing system overhead.

Hereinafter, various embodiments will be described in more detail, including the embodiments that have been described with reference to FIGS. 1 to 9. For convenience of description and ease of understanding, in this specification, a BSR format that identifies a buffer size on an LCG basis is exemplified. However, this may be applicable to a BSR format that identifies a buffer size on a logical channel basis.

Each of the following embodiments may be used independently, and some or all of the embodiments may be used in combination with each other.

First Embodiment: Method of Configuring Information Indicating Whether Two or Three Bits are Used for the LCG Identification Information Field (LCG ID Field) Through RRC Signaling For example, when two bits are allowed for the LCG ID field, the Short BSR and Truncated BSR MAC control element format of FIG. 2 may be used. Accordingly, in this case, it is possible to transmit Short BSR or Truncated BSR without overhead of seven bits as show in FIG. 7. Therefore, unnecessary system overhead may not occur. Although NR may provide various types of traffic or services such as massive MTC service or URLLC service other than eMBB service, in some cases, the number of logical channels/LCGs that are simultaneously provided through an NR (PDU/PDN) session may be less than or equal to four. Accordingly, the format of FIG. 2 may be used.

However, in specific cases, the number of logical channels/LCGs that are simultaneously provided through one NR session may exceed four and reach eight. In these cases, the system overhead occurrence problem may arise.

Accordingly, by separately handling this case, the base station may control the use of the BSR format.

For example, when the number of logical channels/LCGs that are simultaneously provided to one terminal is less than four (or when two bits are to be used for the LCG ID), the base station may instruct the terminal to use the Short BSR or Truncated BSR MAC control element of FIG. 2 through signaling.

For another example, when the number of logical channels/LCGs that are simultaneously provided to one terminal is up to eight (or when three bits are to be used for the LCG ID), the base station may instruct the terminal to use the Short BSR or Truncated BSR MAC control element of FIG. 4 through signaling. Alternatively, the base station may instruct the terminal to use the format of FIGS. 6 to 8. That is, the base station may instruct the terminal to use a format capable of BSR transmission for more than four logical channels or LCGs.

In detail, the terminal may receive, from the base station, information for specifying that the number of bits of the LCG ID field are to be two or three through RRC signaling (or L2 signaling).

As described above, the terminal may use either of the two formats to transmit the BSR, in which case the base station may notify the terminal of a format to be used.

Second Embodiment: Method of Coding the Buffer Size Field Using Five Bits

For example, when the number of LCGs increases to eight in NR (e.g., the LCG ID field consists of three bits), a buffer size (BS) field may be coded using five bits and then transmitted in order to provide the Short BSR or Truncated BSR MAC control element by using one byte.

A buffer size level (BS level) is provided as a BS table having coded values, and there may be two BS tables. Both the two BS tables may be coded using six bits. The terminal may configure or use one of the two tables through information indicated through RRC signaling. For example, the information indicated through RRC signaling is transmitted through extendedBSR-Sizes field. When a value of the corresponding field is configured, the terminal may configure and use extended BSR size levels in the two tables.

Accordingly, according to the present disclosure, when eight LCG IDs are used, the terminal may store tables capable of indicating a plurality of buffer size indices, and a table to be fixed and used for each BSR format or according to an indication from the base station may be determined. In this case, unlike that described above, the tables may have different bits. For example, one table may include six bits as in the typical case, and another table may include five bits.

FIG. 10 illustrates a table for generating index information included in a buffer size field of five bits according to an embodiment.

For example, referring to FIG. 10, a BS table indicating a buffer size level coded using five bits may be defined and thus the Short BSR or Truncated BSR MAC control element may be composed of an LCG ID field of three bits and a buffer size field of five bits and then used. That is, when the buffer size field is formed of five bits, an index indicating the level of the buffer size using the table of FIG. 10 may be included. To this end, the base station may notify the terminal of a corresponding BSR size through RRC signaling. Alternatively, the base station may instruct the terminal to use a corresponding BSR format through RRC signaling. Alternatively, the base station may instruct the terminal to use a corresponding BS table through RRC signaling. Alternatively, the corresponding BS table may be fixedly used.

FIG. 11 illustrates a table for generating index information included in a buffer size field of six bits according to an embodiment.

For another example, the Short BSR or Truncated BSR MAC control element may even be configured using a specific buffer size index that may be used through five bits in a typical BS table coded using six bits.

When the number of specific buffer size indices is 32, normal BSR size levels, starting from BS=0 with index=0 to 967<BS<=1132 with index=31, may be included in the Short BSR or Truncated BSR MAC control element.

When the number of specific buffer size indices is 32, extended BSR size levels, starting from BS=0 with index=0 to 4017<BS<=4940 with index=31, may be included in the Short BSR or Truncated BSR MAC control element.

When the number of specific buffer size indices is 31, normal BSR size levels, starting from BS=0 with index=0 to 826<BS<=967 with index=30, may be included in the Short BSR or Truncated BSR MAC control element. In this case, index=31 may indicate BS>967.

When the number of specific buffer size indices is 31, extended BSR size levels, starting from BS=0 with index=0 to 3267<BS<=4017 with index=30, may be included in the Short BSR or Truncated BSR MAC control element. In this case, index=31 may indicate BS>4017.

Like this, a separate 5-bit buffer size field may be additionally included and used for control by the base station. Alternatively, only some sections of the original buffer size field may be used to determine a 5-bit buffer size field value.

Meanwhile, a transmission rate may significantly increase in NR. In this case, a new BS table may be introduced. The corresponding BS table may be used by the terminal through RRC signaling. Alternatively, the corresponding BS table may be fixedly used. For another example, whether to use the new BS table may be added to the BSR format and then transmitted. In this case, for another example, the Short BSR or Truncated BSR MAC control element may be configured even using a specific buffer size index that may be used through five bits in a BS table newly coded using six bits or more.

Third Embodiment: Method of Indicating Logical Channel ID Information by Additionally Using One Bit on the MAC Subheader In LTE, a MAC PDU includes a MAC header, zero or more MAC SDUs, zero or more MAC CEs, and optional padding. The MAC header includes one or more MAC subheaders. Each subheader corresponds to a MAC SDU, a MAC CE, or padding.

In NR, the MAC subheader does not include an extension field (E field). In NR, the MAC subheader is located immediately ahead of the corresponding MAC SDUs, MAC CEs, or padding, and thus there is no need for the E field unlike LTE. Also, an F2 field, which is used to determine the size of the L field, is not included in NR in order to reduce overhead. However, variable-length L field and F field with two values are included. In this case, F indicates a format field, and L indicates a length field.

Figure 12:
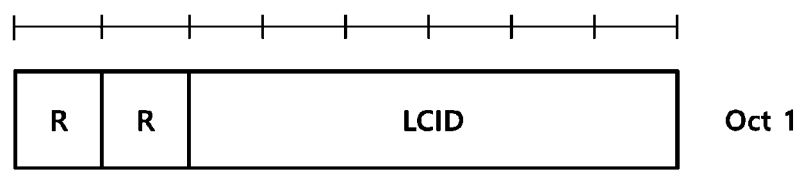
FIG. 12 shows a MAC subheader corresponding to when a fixed-sized MAC control element is used according to an embodiment.
Figure 13:
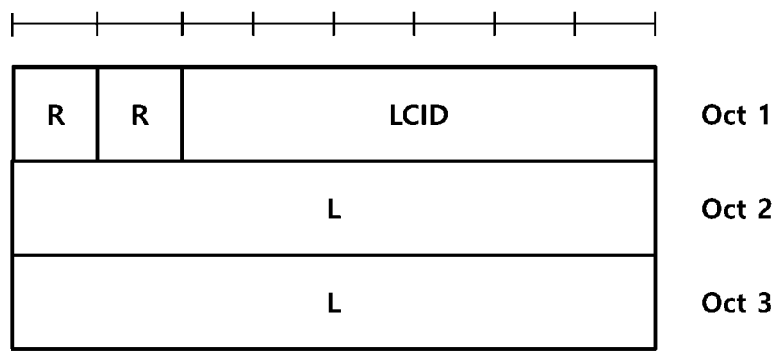
FIG. 13 shows a MAC subheader corresponding to when a 16-bit L field is used according to an embodiment.

FIG. 12 shows a MAC subheader corresponding to when a fixed-sized MAC control element is used according to an embodiment. FIG. 13 shows a MAC subheader corresponding to when a 16-bit L field is used according to an embodiment.

As shown in FIG. 12, in NR, the size of the LCID field is 6 bits. This is increased to support more LCID values compared to LTE. L field is not included for a fixed-sized MAC CE. Also, as shown in FIG. 13, L field is included for variable size MAC CE. L field is included for all the MAC SDUs.

For example, when the number of LCGs increases to eight in the NR (e.g., the LCG ID field consists of three bits), a specific number of bits on the MAC subheader may be utilized to provide the Short BSR or Truncated BSR MAC control element by using one byte. For convenience of description, a method of utilizing one bit on the MAC subheader is described as an embodiment, but it is also within the scope of this disclosure to utilize one or more bits on the MAC subheader.

For example, the Short BSR or Truncated BSR MAC control element may include an LCG ID field of two bits and a buffer size field of six bits.

In order to use three bits to identify an LCG ID, two bits of the LCG ID of the Short BSR or Truncated BSR MAC control element and any one bit on the MAC subheader, i.e., a total three bits may be utilized to identify/separate/use the LCG ID. For example, as the one bit on the MAC subheader, one of R bits on the MAC subheader may be used. For another example, as the one bit on the MAC subheader, one of F bits on the MAC subheader may be used.

For convenience of description, the use of a 16-bit L field is exemplified as shown in FIG. 13, but the use of any number of bits as an L field is also included in the scope of the present disclosure.

In this case, the two bits of the LCG ID and the one bit on the MAC subheader may be combined in sequence. Alternatively, the one bit on the MAC subheader and the two bits of the LCG ID may be combined in sequence.

Fourth Embodiment: Method of Indicating Buffer Size Information by Additionally Using One Bit on the MAC Subheader For example, the Short BSR or Truncated BSR MAC control element may include an LCG ID field of three bits and a buffer size field of five bits. However, the buffer size field may carry the buffer size information using the above-described tables with indices 0 to 63. Accordingly, the buffer size field of five bits cannot carry 6-bit buffer size index information.

Accordingly, five bits of the buffer size field of the Short BSR or Truncated BSR MAC control element and any one bit on the MAC subheader may be used in combination to classify buffer size levels using six bits, and the LCG ID may be identified with three bits. For convenience of description, the use of a 6-bit BS table has been described as an example, but the use of any number of bits for the buffer size level is also included in the scope of the present disclosure.

For example, one bit on the MAC subheader used to indicate the buffer size field may be one of R bits on the MAC subheader. For another example, the one bit on the MAC subheader may be one of F bits on the MAC subheader.

In this case, the five bits of the buffer size field and the one bit on the MAC subheader may be combined in sequence. Alternatively, the one bit on the MAC subheader and the five bits of the buffer size field may be combined in sequence.

Fifth Embodiment: Method of Identifying a BSR Format for Each LCG Through LCID

For another example, LCID may be specified to indicate a Short BSR or Truncated BSR MAC control element for a specific LCG. For example, a corresponding LCID may have a different value from the LCID of the Short BSR or Truncated BSR MAC control element. For another example, the corresponding LCID may have LCID of a Short BSR control element for a specific LCG.

For still another example, the corresponding LCID may have LCID of a Truncated BSR MAC control element for a specific LCG.

As described above, when the MAC BSR Control element format is configured through this embodiment, a bit included in the MAC BSR Control element field and a bit included in its associated MAC subheader (or a bit included in any field included in the associated MAC subheader) may be used together as a value of a field included in the MAC BSR Control element (or in order to identify the value of the field included in the MAC BSR Control element). This may be applied to any MAC Control element as well as the MAC BSR Control element. For example, a bit included in any MAC Control element field and a bit included in its associated MAC subheader (or a bit included in any field included in the associated MAC subheader) may be used together as a value of a field included in the MAC Control element (or in order to identify the value of the field included in the MAC Control element).

For another example, a bit included in any MAC Control element field and a bit included in its associated MAC subheader (or a bit included in any field included in the associated MAC subheader) may be used together as a value of a field included in the MAC subheader (or in order to identify the value of the field included in the MAC subheader).

For another example, a bit included in any Layer 2 header field and a bit included in its associated L2 payload (or a bit included in any field included in the associated L2 payload) may be combined/used together as a value of a field included in the L2 payload (or in order to identify the value of the field included in the L2 payload).

For still another example, a bit included in any Layer 2 header field and a bit included in its associated L2 payload (or a bit included in any field included in the associated L2 payload) may be combined/used together as a value of a field included in the L2 header (or in order to identify the value of the field included in the L2 header).

An embodiment in which BSR is effectively transmitted when the number of LCGs is increased to eight will be additionally described.

Method of Using an Additional BSR Format Having a Specified Size

FIG. 14 illustrates a Long BSR format set to a specified size according to an embodiment.

For an example, when one LCG has available data for transmission in a TTI in which the BSR is transmitted, the terminal may transmit Short BSR as shown in FIG. 4.

For another example, when one or more LCGs have available data for transmission in the TTI in which the BSR is transmitted, the terminal may transmit Long BSR as shown in FIG. 14.

For still another example, when one or more LCGs have available data for transmission in the TTI in which the BSR is transmitted, the terminal may report Long BSR as shown in FIG. 14.

For further still another example, when one or more LCGs have available data for transmission in the TTI in which the BSR is transmitted, the terminal may transmit BSR having a specific size. The corresponding BSR may include one or more of the LCG ID field and the buffer size field. The above-described specific size may represent the number of LCGs having available uplink data included in the BSR. The terminal may be notified of this by the base station. For example, the terminal may be notified through RRC signaling. For another example, the terminal may be notified through a MAC CE, and an LCID may be specified for the MAC CE.

For yet still another example, the BSR having a specified size may be defined as Truncated BSR and then used. Alternatively, the BSR having a specified size may be used as a new BSR which is distinguished from Truncated BSR.

Here, the buffer size field identifies the total amount of data available across all logical channels of an LCG after all MAC PDUs for the TTI have been built. The amount of data is indicated in number of bytes. It shall include all data that is available for transmission in the RLC layer and in the PDCP layer (or the RLC layer, the PDCP layer, a new AS sublayer). For example, the size of the RLC and MAC headers are not considered in the buffer size computation. For another example, the RLC header may be considered in the buffer size computation even though the MAC header is still not considered. This is because the RLC header may be built through preprocessing by removing a concatenation function from an RLC layer so that it is preferable to include the RLC header in order to accurately compute a buffer size. The definition of the buffer size field may be applied to other embodiments. For another example, the size of the RLC and MAC headers may be considered (included) in the buffer size computation. This is possible when considering new header processing different from that of LTE.

Method of Indicating the Number of LCGs Having Available Data for Transmission Through the BSR FIG. 15 illustrates a BSR format for specifying the number of LCGs through a BSR according to an embodiment.

For example, when one LCG has available data for transmission in a TTI m which the BSR is transmitted, the terminal may transmit BSR including the number of LCGs.

For another example, when one or more LCGs have available data for transmission in the TTI in which the BSR is transmitted, the terminal may transmit BSR including the number of LCGs.

The corresponding BSR may have the number of LCGs having available data for transmission (depicted as Length in FIG. 15 for convenience of description, thus another term may be used instead), a LCG ID field, and a buffer size field. The specific size represents the number of LCGs included in the BSR.

When the number of LCGs having available data for transmission is eight (all), the LCG ID field may be omitted, and a BSR may be created with only the buffer size field.

Method of Indicating the Entire Buffer Size of an LCG Having Available Data for Transmission For example, when one or more LCGs have available data for transmission in the TTI in which the BSR is transmitted, the terminal may sum the buffer sizes of all the LCGs having available data for transmission and then report the BSR.

That is, the terminal does not divide and deliver the buffer size information for each LCG but may transmit a BSR to the base station by including information regarding the entire available data as one piece of buffer size information.

Method of Indicating a Buffer Size Corresponding to the Sum of Available Data for Transmission of the Other LCGs For example, when one or more LCGs have available data for transmission in the TTI in which the BSR is transmitted, the terminal may indicate, as the BSR, a buffer size corresponding to a buffer size of an LCG ID and an LCG ID of an LCG with the highest priority plus available data for an LCG ID having available data for the other transmission.

For another example, when one or more LCGs have available data for transmission in the TTI in which the BSR is transmitted, the terminal may indicate, as the BSR, a buffer size corresponding to a buffer size of LOG IDs and LCG IDs of a specific number of LCGs plus available data for an LCG ID having available data for the other transmission. In this case, the LCG IDs of the specific number of LCGs may be included in order of priority. The specific number may be pre-configured in the terminal or specified by the base station. For example, the terminal may be notified of the specific number through RRC signaling. For another example, the terminal may be notified of the specific number through a MAC CE, and an LCID may be specified for the MAC CE. For still another example, the specific number may be included in the BSR and then transmitted.

Method of Indicating BSR by Defining a Field Indicating Whether Each LCG is Included For example, when one LCG has available data for transmission in the TTI in which the BSR is transmitted, the NR may define a field indicating whether each LCG is included and then report the BSR.

For another example, when one or more LCGs have available data for transmission in the TTI in which the BSR is transmitted, the NR may define a field indicating whether each LCG is included and then report the BSR.

The corresponding BSR may include the buffer size field and the field indicating whether each LCG is included. The field indicating whether each LCG is included may indicate, for each LCG, a case of having available uplink data and a case of not having available uplink data by setting the cases to 1 and 0 (or 0 and 1) using one bit. Thus, it is possible to indicate whether each of eight LCGs has available uplink data through eight bits (which may be depicted as LI0 to LI7 or LI1 to LI8).

FIG. 16 illustrates a Long BSR format according to another embodiment.

LCG indices of an LCG indication field may be included in descending order as shown in FIG. 16 or FIG. 17.

Referring to FIG. 16, when the value of the LCG indication field is set to "01010100," this may indicate that buffer size information for LCGs 2, 4, and 6 is included in a corresponding BSR. The buffer size field may be formed of six bits as described above or may be formed of eight bits as shown in FIG. 17.

FIG. 17 illustrates a Long BSR format according to still another embodiment.

Referring to FIG. 17, the Long BSR may include an LCG indication field indicating whether each LCG is included and a buffer size field. The buffer size field may be formed of eight bits and may include only buffer size information for an LCG indicated by the LCG indication field.

For example, the buffer size field may include only a buffer size of available uplink data of an LCG having the available uplink data. For example, as shown in FIG. 6, when eight bits of the LCG indication field is "01010100" (when the second, fourth, and sixth LCGs have available uplink data), the buffer size field may include only buffer sizes of the second, fourth, and sixth LCGs. In this case, the buffer size field may be included in descending order of priority. For example, as shown in FIG. 17, buffer size information for the second, fourth, and sixth LCGs may be included in sequence. Alternatively, the buffer size field may be included in the same order as that of the LCG indication field. For example, buffer size information for the sixth, fourth, and second LCGs may be included in sequence.

For another example, the buffer size field may include buffer sizes of available uplink data of all the LCGs.

For still another example, the buffer size field may include buffer sizes of data included in the LCGs according to priority.

To this end, the terminal may monitor triggering of a regular BSR or a periodic BSR. For example, the terminal may monitor whether the BSR is triggered. The terminal may configure three timers (e.g., periodicBSR-Timer, retx-BSR-Timer, and logicalChannelSR-ProhibitTimer) and may monitor whether the BSR is triggered by using the periodic BSR timer and the retransmission BSR timer. Also, the terminal may monitor whether the above-described BSR event has occurred and may check whether the BSR is triggered and whether a BSR to be transmitted is a regular BSR or a periodic BSR. Also, as necessary, the terminal may monitor whether the BSR is a padding BSR When available data for uplink transmission is present in the one or more LCGs, the terminal may determine the BSR format as Long BSR. The terminal may determine a BSR format for the BSR. For example, when available data for uplink transmission is present in the one or more LCGs in one TTI, the terminal may determine the BSR format as Long BSR in order to transmit the BSR. The TTI may refer to any physical layer TTI defined in NR. For example, the TTI may be one subframe, one slot, one mini-slot, n mini-slots, n slots, and n symbols (here, n is a natural number), and may be configured in the terminal through an RRC message by the base station. For another example, when the BSR is transmitted, available data for uplink transmission may be present in one or more LCGs. In this case, the terminal may determine the BSR format to be Long BSR in order to transmit the BSR. For still another example, when the BSR is triggered, available data for uplink transmission may be present in one or more LCGs. In this case, the terminal may determine the BSR format as Long BSR in order to transmit the BSR.

Subsequently, when the normal BSR or the periodical BSR is triggered, the terminal may transmit BSRs for all LCGs having available data for uplink transmission configured in a Long BSR format to the base station. When the BSR is transmitted, available data for uplink transmission may be present in one or more LCGs. In this case, the terminal transmits, to the base station, the BSRs for all the LCGs having available data for the regular BSR or the periodic BSR.

For example, the terminal may transmit a BSR of the Long BSR format to the base station in the form of the regular BSR or the periodic BSR to notify the base station of the buffer status information of the terminal.

For example, the BSR configured in the Long BSR format may include an LCG indication field and a buffer size field. In this case, the LCG indication field includes information indicating whether a buffer size field for each LCG is present in the BSR. Also, the LCG indication field may be configured as an 8-bit bitmap to indicate whether a buffer size field for each LCG is present.

Also, the LCG indication field indicates whether a buffer size field is present for each of eight LCGs, and the buffer size field may include only buffer size information for an LCG having available data in descending order of priority.

The buffer size field is formed of eight bits for each LCG and includes index information set according to the buffer size information for each LCG. The index information may be mapped according to a range of the buffer size information and determined according to a predetermined table.

As described above, when the terminal sets the Long BSR format in order to transmit a BSR including buffer status information for all LCGs having available data, the terminal may configure the Long BSR format including an LCG indication field and a buffer size field having the buffer status information in order to minimize overhead.

As described above, it will be appreciated that the above-described format of FIG. 16 or 17 may be utilized when the BSR is transmitted through padding bits.

Method of Defining an Extension Field and Indicating Whether a Logical Channel Added to the BSR is Present For example, when one LCG has available data for transmission in a TTI m which the BSR is transmitted, the terminal may define an extension field and transmit the BSR.

For another example, when one or more LCGs have available data for transmission in a TTI in which the BSR is transmitted, the terminal may define an extension field and transmit the BSR The BSR may include a buffer size for each LCG having available data for transmission depending on priority. The BSR may include one or more of the LCG ID field, the buffer size field, and the extension field.

The extension field represents a flag field for indicating whether additional LCG(s) having available data is/are present behind the corresponding LCG, the flag field being set to 1 and 0 (or 0 and 1).

For convenience of description, the corresponding field is depicted as an extension field (E in FIG. 18). This is just for convenience of description, and any other name may be used instead.

FIG. 18 illustrates a BSR format using an extension field according to an embodiment.

Referring to FIG. 18, when an LCG ID with the highest priority is LCG ID 1, LCG ID 1 is included first. Also, when LCG ID 1 and LCG ID 2 have available data, the extension field may indicate, as 1, a case in which additional LCG(s) having available data is/are present. As shown in FIG. 13, the first E is set to 1, the second E is set to 1, and the third E is set to 0.

Method of Indicating a Plurality of LCGs in Truncated BSR

When, for a padding BSR, the number of padding bits is greater than or equal to the size of the Short BSR plus its subheader but less than the size of the Long BSR plus its subheader, and when one or more LCGs have available data for transmission in the TTI in which the BSR is transmitted, Truncated BSR of an LCG including a logical channel having the highest priority and available data for transmission is transmitted. In the typical LTE technology, Padding BSR or Truncated BSR carries only a buffer size for one logical channel with the highest priority. In NR, Padding BSR or Truncated BSR may be allowed to carry buffer sizes of one or more LCGs. For example, the above-described methods may be used individually or in combination. For another example, as many LCGs as possible within the number of padding bits are allocated to carry buffer sizes in the order of priority.

Method of Using an Integrated BSR Format

For example, by using one of the above-described methods, buffer status transmission may be performed using one integrated BSR format.

For another example, the buffer status transmission for triggered BSR or triggered LCG may be performed using an integrated BSR format according to a typical trigger criterion or after defining a specific trigger criterion.

As described above, according to the present disclosure, the terminal may transmit, to the base station, buffer status information for a number of LCGs more than the number of LCGs transmitted typically while minimizing radio resource overhead.

The configurations of a terminal and a base station that may perform some or all of the operations of the above-described embodiments will be described again with reference to the following drawings.

Figure 19:
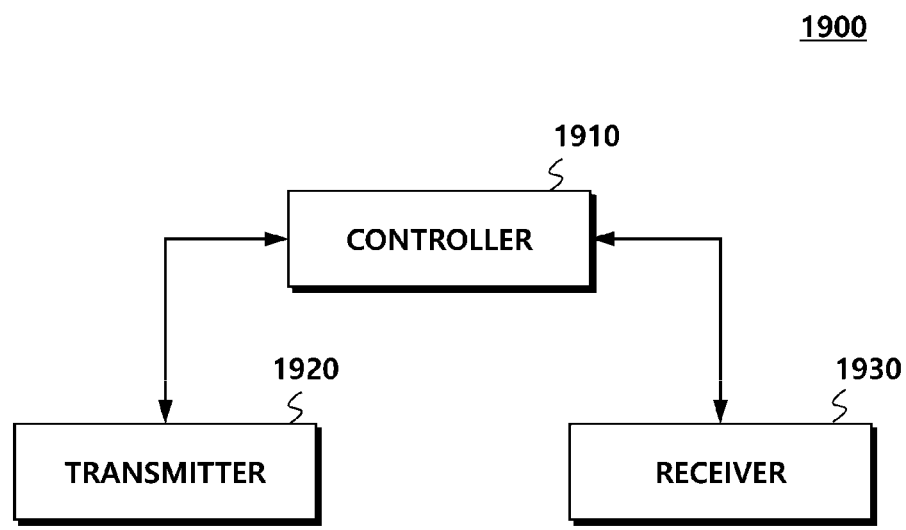
FIG. 19 shows the configuration of a terminal configuration according to an embodiment.

FIG. 19 shows a terminal according to an embodiment.

Referring to FIG. 19, a terminal 1900 for transmitting a BSR may include a receiver 1930 configured to receive allocation information for uplink resources from a base station, a controller 1910 configured to determine whether the number of padding bits for data transmission using the uplink resources is i) greater than or equal to a first value, which is the size of Short BSR plus its subheader, and ii) less than a second value, which is the size of Long BSR plus its subheader and configured to determine whether available data for uplink transmission is present in one or more LCGs when the number of padding bits is i) greater than or equal to the first value and ii) less than the second value, and a transmitter 1920 configured to transmit Short Truncated BSR or Long Truncated BSR to the base station according to a result of comparison between the number of padding bits and the first value when available data for uplink transmission is present in the one or more LCGs.

For example, the receiver 1930 may receive allocation information for radio resources to be used to transmit uplink data through scheduling by the base station. For example, the receiver 1930 may receive an uplink grant from the base station and receive information regarding radio resources to be used to transmit uplink data to the base station. For another example, the terminal may receive the allocation information through the PDCCH from the base station.

As necessary, the transmitter 1920 may transmit the uplink data to the base station by using the allocation information. To this end, the transmitter 1920 may transmit information for indicating that there is uplink data to be transmitted to the base station.

Meanwhile, when the uplink data is transmitted according to the allocation information, the transmitter 1920 may transmit padding bits in addition to the uplink data according to allocated radio resources. In this case, the transmitter 1920 may transmit a BSR, in addition to the padding bits, to the base station. Accordingly, the terminal 1900 may deliver information regarding available data to be transmitted to the base station by efficiently utilizing the padding bits.

For example, in order to utilize the padding bits to deliver the BSR, the controller 1910 may compare the number of padding bits to the size of the MAC CE when the BSR is transmitted. For example, the controller 1910 determines a first value by adding the size of Short BSR and the size of its subheader and compares the number of padding bits to the first value. For another example, the controller 1910 determines a second value by adding the size of Long BSR and the size of its subheader and compares the number of padding bits to the second value. For still another example, the controller 1910 determines whether the number of padding bits is greater than or equal to the first value and less than the second value. Based on the result, the controller 1910 may determine whether to transmit a padding BSR.

When the number of padding bits is greater than or equal to the first value and less than the second value, the controller 1910 may determine whether the available data for uplink transmission is present in one or more LCGs. That is, the controller 1910 determines whether the number of padding bits is sufficient to transmit the padding BSR and determines whether available data is present for BSR transmission. Based on the result, the controller 1910 may determine whether to transmit the padding BSR.

When the number of padding bits is sufficient to transmit the padding BSR, and available data for uplink transmission is present in one or more LCGs, the controller 1910 determines a BSR format according to a result of the comparison between the number of padding bits and the first value. In this case, the BSR may be set and transmitted in the format of Short Truncated BSR or Long Truncated BSR. Also, when the number of padding bits is equal to the first value, the controller 1910 may perform control to transmit the BSR to the base station by using the Short Truncated BSR format. On the other hand, when the number of padding bits exceeds the first value, the controller 1910 may perform control to transmit the BSR to the base station by using the Long Truncated BSR format.

In addition, when the number of LCGs that are needed to perform all the embodiments increases, the controller 1910 controls the entire operation of the terminal to perform various embodiments for efficiently transmitting BSR for a corresponding LCG independently or in combination. The transmitter 1920 and the receiver 1930 are used to transmit and receive a signal, a message, or data needed to implement the above-described disclosure to and from the base station.

Figure 20:
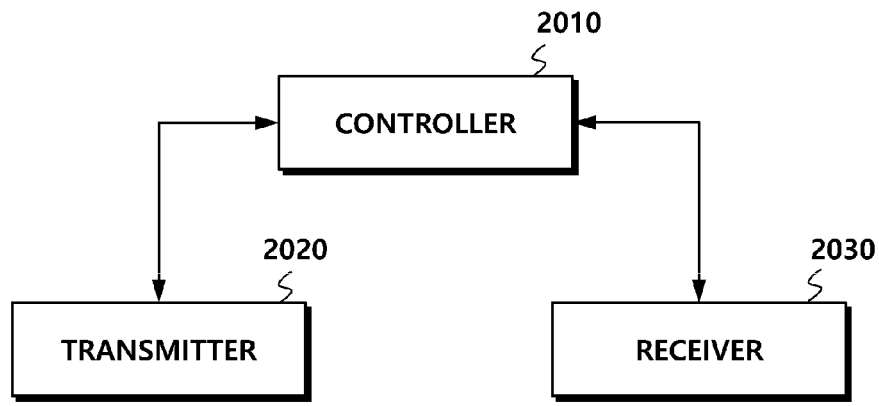
FIG. 20 shows the configuration of a base station according to an embodiment.

FIG. 20 shows a base station according to an embodiment.

Referring to FIG. 20, a base station 2000 for receiving a BSR may include a transmitter 2020 configured to transmit allocation information for uplink resources to a terminal, a receiver 2030 configured to receive Short Truncated BSR or Long Truncated BSR determined based on the number of padding bits according to data transmission using the uplink resources when available data for uplink transmission is present in one or more LCGs of the terminal, and a controller 2010 configured to confirm the available data for the uplink transmission of the one or more LCGs of the terminal according to the Short Truncated BSR or Long Truncated BSR.

Upon a scheduling request from the terminal, the transmitter 2020 may transmit, to the terminal, allocation information for radio resources that may be used by the terminal to transmit uplink data. For example, the receiver 2030 may receive a scheduling request from the terminal, and the transmitter 2020 may transmit an uplink grant to the terminal. For another example, the transmitter 2020 may transmit the allocation information to the terminal through the PDCCH. As necessary, the terminal may transmit the uplink data to the base station 2000 by using the allocation information. To this end, the terminal may transmit, to the base station 2000, information for indicating that there is uplink data to be transmitted.

The receiver 2030 may receive a buffer status repot of the terminal through padding bits of the uplink data transmitted by the terminal. As described above, in this case, whether to transmit the BSR may be determined depending on comparison between the number of padding bits and the size of MAC CE of Short BSR or Long BSR.

For example, when the number of padding bits is i) greater than or equal to a first value, which is the size of Short BSR plus its subheader, and ii) less than a second value, which is the size of Long BSR plus its subheader, the Short Truncated BSR may be received when the number of padding bits is equal to the first value.

For another example, when the number of padding bits is i) greater than or equal to a first value, which is the size of Short BSR plus its subheader, and ii) less than a second value, which is the size of Long BSR plus its subheader, the Long Truncated BSR may be received when the number of padding bits exceeds the first value.

The controller 2010 may acquire information regarding available data to be carried by an LCG of the terminal to the base station through padding bits of the transmitted uplink data. However, as described above, each BSR includes buffer size information of an LCG selected by the terminal due to a restriction on the number of padding bits.

For example, the Short Truncated BSR may include buffer size information for one LCG including a logical channel with the highest priority among the one or more LCGs and may include an LCG identification information field of 3 bits and a buffer size field of 5 bits.

For another example, the Long Truncated BSR may include an LCG indication field and a buffer size field, and the LCG indication field may be configured as an 8-bit bitmap to indicate whether the buffer size field is present for each of eight LCGs. The Long Truncated BSR includes buffer size information for one or more selected LCGs. The one or more LCGs are selected on the basis of descending order of priorities set for individual logical channels and selected on the basis of ascending order of LCG identification information when a plurality of LCGs include logical channels with the same priority.

Thus, the controller 2010 may receive BSR from the terminal and check information regarding available data for uplink transmission of the terminal.

In addition, when the number of LCGs that are needed to perform all the embodiments increases, the controller 2010 controls the entire operation of the base station to perform various embodiments for efficiently transmitting BSR for a corresponding LCG independently or in combination. The transmitter 2020 and the receiver 2030 are used to transmit and receive a signal, a message, or data needed to implement the above-described disclosure to and from the terminal.

According to the embodiments, it is possible to transmit a BSR while minimizing radio resource overhead even when the number of LCGs increases, thus allowing a base station to efficiently perform uplink resource allocation.

Specifications and standards mentioned in the foregoing embodiments are omitted herein to simplify the description of the specification and constitute a part of the present specification. Therefore, it should be understood that part of the specifications and standards can be added to the present specification or be specified in the claims within the scope of the present invention.

The above description is only illustrative of the technical idea of the present disclosure, and those skilled in the art will appreciate that various modifications, additions and substitutions are possible without departing from the essential characteristics of embodiments of the invention. Therefore, the embodiments disclosed herein are intended not to limit but to describe the technical spirit of the present disclosure, and the scope of the present invention is not limited to the embodiments. The scope of the embodiments of the invention should be construed by the appended claims, and all technical spirits within the scope of their equivalents should be construed as included in the scope of the invention.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for transmitting, by a terminal, a buffer status report (BSR), the method comprising:
   receiving allocation information for uplink resources from a base station;
   determining whether a number of padding bits for data transmission using the uplink resources is i) greater than or equal to a first value and ii) less than a second value, wherein the first value is a size of Short BSR plus a subheader of the Short BSR and the second value is a size of Long BSR plus a subheader of the Long BSR;
   determining whether available data for uplink transmission is present in one or more logical channel groups (LCGs) when the number of padding bits is i) greater than or equal to the first value and ii) less than the second value; and
   transmitting one of Short Truncated BSR and Long Truncated BSR to the base station according to a result of comparison between the number of padding bits and the first value when available data for uplink transmission is present in the one or more LCGs,
   wherein the transmitting comprises:
   transmitting the Short Truncated BSR when the number of padding bits is equal to the first value; and
   transmitting the Long Truncated BSR when the number of padding bits exceeds the first value.

2. The method of claim 1,
   wherein the Short Truncated BSR includes buffer size information for one LCG including a logical channel with the highest priority among the one or more LCGs, and
   wherein the Short Truncated BSR includes an LCG identification information field of three bits and a buffer size field of five bits.

3. The method of claim 1,
   wherein the Long Truncated BSR includes an LCG indication field and a plurality of buffer size fields, and
   wherein the LCG indication field indicates whether a buffer size field is present for each LCG.

4. The method of claim 3, wherein the LCG indication field is configured as an 8-bit bitmap and indicates whether the buffer size field is present for each of eight LCGs.

5. The method of claim 3,
   wherein the buffer size field is formed of eight bits for each LCG and includes index information set according to buffer size information of each LCG, and
   wherein the index information is mapped according to a range of the buffer size information and determined according to a predetermined table.

6. The method of claim 3,
   wherein the Long Truncated BSR includes buffer size information for one or more LCGs selected, and
   wherein the one or more LCGs are selected based on descending order of priority set for each logical channel and selected based on ascending order of LCG identification information when a plurality of LCGs includes logical channels with the same priority.

7. A method for receiving, by a base station, a buffer status report (BSR), the method comprising;
   transmitting allocation information for uplink resources to a terminal;
   receiving one of Short Truncated BSR and Long Truncated BSR determined based on a number of padding bits according to data transmission using the uplink resources when available data for uplink transmission is present in one or more logical channel groups (LCGs) of the terminal; and
   confirming the available data for the uplink transmission of the one or more LCGs of the terminal according to one of the Short Truncated BSR and Long Truncated BSR,
   wherein the number of padding bits is i) greater than or equal to a first value and ii) less than a second value where the first value is a size of Short BSR plus a subheader of the Short BSR, and the second value is a size of Long BSR plus a subheader of the Long BSR, and
   wherein the Short Truncated BSR is received when the number of padding bits is equal to the first value.

8. The method of claim 7,
   wherein the number of padding bits is i) greater than or equal to a first value and ii) less than a second value, where the first value is a size of Short BSR plus a subheader of the Short BSR, and the second is a size of Long BSR plus a subheader of the Long BSR, and
   wherein the Long Truncated BSR is received when the number of padding bits exceeds the first value.

9. The method of claim 7,
   wherein the Short Truncated BSR includes buffer size information for one LCG including a logical channel with the highest priority among the one or more LCGs, and
   wherein the Short Truncated BSR includes an LCG identification information field of three bits and a buffer size field of five bits.

10. The method of claim 7,
    wherein the Long Truncated BSR includes an LCG indication field and a buffer size field, and
    wherein the LCG indication field is configured as an 8-bit bitmap and indicates whether a buffer size field is present for each of eight LCGs.

11. A terminal for transmitting a buffer status report (BSR), the terminal comprising:
    a receiver configured to receive allocation information for uplink resources from a base station;
    a controller configured to determine whether a number of padding bits for data transmission using the uplink resources is i) greater than or equal to a first value and ii) less than a second value, and determine whether available data for uplink transmission is present in one or more logical channel groups (LCGs) when the number of padding bits is i) greater than or equal to the first value and ii) less than the second value, where the first value is a size of Short BSR plus a subheader of the Short BSR, and the second value is a size of Long BSR plus a subheader of the Long BSR; and a transmitter configured to transmit one of Short Truncated BSR and Long Truncated BSR to the base station according to a result of comparison between the number of padding bits and the first value when available data for uplink transmission is present in the one or more LCGs, wherein the transmitter transmits the Short Truncated BSR when the number of padding bits is equal to the first value, and wherein the transmitter transmits the Long Truncated BSR when the number of padding bits exceeds the first value.

12. The terminal of claim 11,
wherein the Short Truncated BSR includes buffer size information for one LCG including a logical channel with the highest priority among the one or more LCGs, and wherein the Short Truncated BSR includes an LCG identification information field of three bits and a buffer size field of five bits.

13. The terminal of claim 11,
wherein the Long Truncated BSR includes an LCG indication field and a buffer size field, and wherein the LCG indication field indicates whether a buffer size field is present for each LCG.

14. The terminal of claim 13, wherein the LCG indication field is configured as an 8-bit bitmap and indicates whether the buffer size field is present for each of eight LCGs.

15. The terminal of claim 13,
wherein the buffer size field is formed of eight bits for each LCG and includes index information set according to buffer size information of each LCG, and wherein the index information is mapped according to a range of the buffer size information and determined according to a predetermined table.

16. The terminal of claim 13,
wherein the Long Truncated BSR includes buffer size information for one or more LCGs selected, and wherein the one or more LCGs are selected based on descending order of priority set for each logical channel and selected based on ascending order of LCG identification information when a plurality of LCGs includes logical channels with the same priority.

* * * * *